US008677403B2

(12) United States Patent
Thompson et al.

(10) Patent No.: US 8,677,403 B2
(45) Date of Patent: Mar. 18, 2014

(54) ADMINISTRATIVE TOOL FOR VIDEO PROGRAMMING (75) Inventors: Matthew J. Thompson, Torrance, CA (US); Mark A Shurgot, Hollyglen, CA (US); David E Feldstein, Santa Monica, CA (US); Edgar Camacho, Torrance, CA (US); Craig Le, Temple City, CA (US); Ilan Tirer, Lomita, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 792 days.

(21) Appl. No.: 11/509,929

(22) Filed: Aug. 25, 2006

(65) Prior Publication Data
US 2007/0050831 A1 Mar. 1, 2007

Related U.S. Application Data (60) Provisional application No. 60/711,939, filed on Aug. 26, 2005.

(51) Int. Cl.
  H04N 5/445 (2011.01)
  G06F 3/00 (2006.01)
  G06F 13/00 (2006.01)
  H04N 7/173 (2011.01)
(52) U.S. Cl.
  USPC ............................................ 725/38; 725/109
(58) Field of Classification Search
  None
  See application file for complete search history.

(56) References Cited

U.S. PATENT DOCUMENTS

| 2002/0067376 | A1* | 6/2002 | Martin et al. ................. 345/810 |
| 2002/0124248 | A1* | 9/2002 | Matey ............................. 725/22 |
| 2003/0110186 | A1* | 6/2003 | Markowski et al. ........ 707/104.1 |
| 2003/0163541 | A1* | 8/2003 | Austin et al. .................. 709/207 |
| 2004/0055017 | A1* | 3/2004 | Delpuch et al. ............... 725/110 |
| 2006/0230427 | A1* | 10/2006 | Kunkel et al. ................ 725/133 |
| 2006/0236342 | A1* | 10/2006 | Kunkel et al. .................. 725/52 |
| 2007/0067724 | A1* | 3/2007 | Takahashi et al. ............ 715/723 |

FOREIGN PATENT DOCUMENTS

| EP | 1 519 580 | 3/2005 |
| WO | WO 00/05887 | 2/2000 |

OTHER PUBLICATIONS

EPO Communication dated Nov. 11, 2008 including Written Opinion of Feb. 1, 2007 in European Patent Application No. 06813770.2 filed Aug. 25, 2006 by Matthew Thompson et al.
EPO communication dated Nov. 18, 2009 in European Patent Application No. 06813770.2 filed Aug. 25, 2006 by Matthew J. Thompson et al.
EPO Summons to attend oral proceedings dated May 3, 2010 in European Patent Application No. 06813770.2 filed Aug. 25, 2006 by Matthew J. Thompson et al.

* cited by examiner

Primary Examiner — Ricky Chin (57) ABSTRACT

A method, apparatus, and article of manufacture for administering a video channel comprising a plurality of video feeds. A method in accordance with the present invention comprises coupling a computer to a transmission station, the transmission station receiving the plurality of video feeds, arranging a plurality of icons on a monitor of the computer to emulate a video layout to be presented, associating a video feed of the plurality of video feeds with an icon of the plurality of icons, and enabling manipulation of the video feeds through the computer.

20 Claims, 10 Drawing Sheets

ADMINISTRATIVE TOOL FOR VIDEO PROGRAMMING

BACKGROUND OF THE INVENTION

1. Field of the Invention

The present invention relates generally to computer Graphical User Interfaces (GUIs), and in particular, to a method, apparatus, and article of manufacture for an administrative tool for video programming.

2. Description of the Related Art

In a typical video programming environment, a producer or technical director controls the flow of video information manually. Each individual video channel is controlled from a control room, where a large number of video monitors, video feeds, and patching equipment are resident, and the video feeds are manually switched from one location to another.

Computers are traditionally used to aggregate and present large amounts of information and manipulation of data. Databases of statistics, as well as computational power, have been easily manipulated by computers for several years. However, computer control of video information has only recently come to the forefront, and has not been used in the traditional television/programming environment.

As such, there is a need in the art that allows for the use of computers and computer programming in a video programming environment.

SUMMARY OF THE INVENTION

To minimize the limitations in the prior art, and to minimize other limitations that will become apparent upon reading and understanding the present specification, the present invention discloses a method, apparatus, and article of manufacture for administering a video channel comprising a plurality of video feeds. A method in accordance with the present invention comprises coupling a computer to a transmission station, the transmission station receiving the plurality of video feeds, arranging a plurality of icons on a monitor of the computer to emulate a video layout to be presented, associating a video feed of the plurality of video feeds with an icon of the plurality of icons, and enabling manipulation of the video feeds through the computer.

Such a method optionally includes displaying data associated with the video feeds within at least one of the plurality of icons, enabling manipulation of the data associated with the video feeds, associating the plurality of icons with a plurality of video cells to be displayed on a video channel, the video feed being a sporting event, the data associated with the video feed being statistics related to the sporting event, and the computer being coupled to the transmission station via a network.

An apparatus in accordance with the present invention comprises a computer having a monitor, and a transmission station, coupled to the computer, for receiving the plurality of video feeds, wherein the monitor displays a plurality of icons to emulate a video layout to be presented, the computer associates a video feed of the plurality of video feeds with an icon of the plurality of icons, and the computer manipulates the video feeds based on inputs received.

Such an apparatus optionally includes the monitor and computer displaying data associated with the video feeds within at least one of the plurality of icons, the computer allowing for manipulation of the data associated with the video feeds, the computer associating the plurality of icons with a plurality of video cells to be displayed on a video channel, the video feed being a sporting event, and the data associated with the video feed being statistics related to the sporting event.

An article of manufacture comprising a program storage medium readable by a computer and embodying one or more instructions executable by the computer to perform a method for administering a video channel comprising a plurality of video feeds in accordance with the present invention uses a method comprising coupling a computer to a transmission station, the transmission station receiving the plurality of video feeds, arranging a plurality of icons on a monitor of the computer to emulate a video layout to be presented, associating a video feed of the plurality of video feeds with an icon of the plurality of icons, and enabling manipulation of the video feeds through the computer.

Such an article of manufacture optionally includes displaying data associated with the video feeds within at least one of the plurality of icons, enabling manipulation of the data associated with the video feeds, associating the plurality of icons with a plurality of video cells to be displayed on a video channel, the video feed being a sporting event, the data associated with the video feed being statistics related to the sporting event, and the computer being coupled to the transmission station via a network.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a system that controls television video output from a remote location via a computer network, e.g., a private network, the Internet, or other network. The present invention can be used to control viewer channels, perform remote reassignment of channels, and other video presentation materials to television viewers.

Hardware Environment

Figure 1:
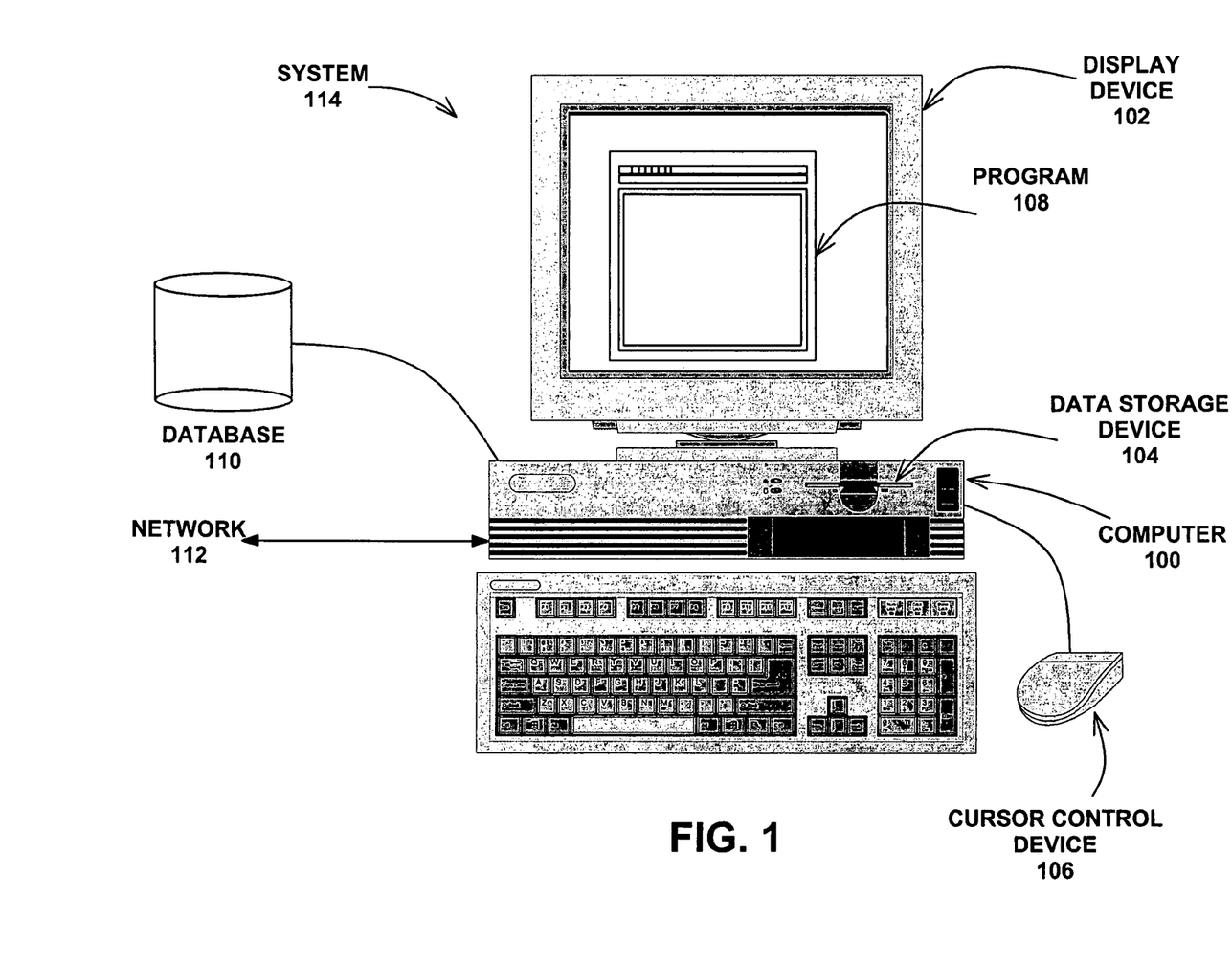
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented program 108, wherein the program 108 is represented by a window displayed on the display device 102. Preferably, the program 108 comprises an internet browser, which enables a user to access various web pages on the Internet. Generally, the program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc. Further, the program 108 may utilize a database 110 such as a spatial database.

Computer 100 may also be connected to other computers 100 (e.g., a client or server computer) via network 112 comprising the Internet, LANs (local area network), WANs (wide area network), or the like. Further, database 110 may be integrated within computer 100 or may be located across network 112 on another computer 100 or accessible device.

Those skilled in the art will recognize that the exemplary environment illustrated in FIG. 1 is not intended to limit the present invention. Indeed, those skilled in the art will recognize that other alternative environments may be used without departing from the scope of the present invention. For example, other computing devices with monitors, such as cellular telephones, Personal Data Assistants (PDAs), or other devices can be used instead of or in conjunction with computer 100 without departing from the scope of the present invention.

Accordingly, FIG. 1 illustrates an integrated system 114 that combines the traditional capabilities of a computer with common video programming management features. In this regard, such an integrated solution enables the use of simple cursor control device 106 movements and keyboard strokes to maneuver video streams from one channel to another, as well as creating additional data streams which can be presented to a viewer.

Satellite Television Delivery System

Figure 2:
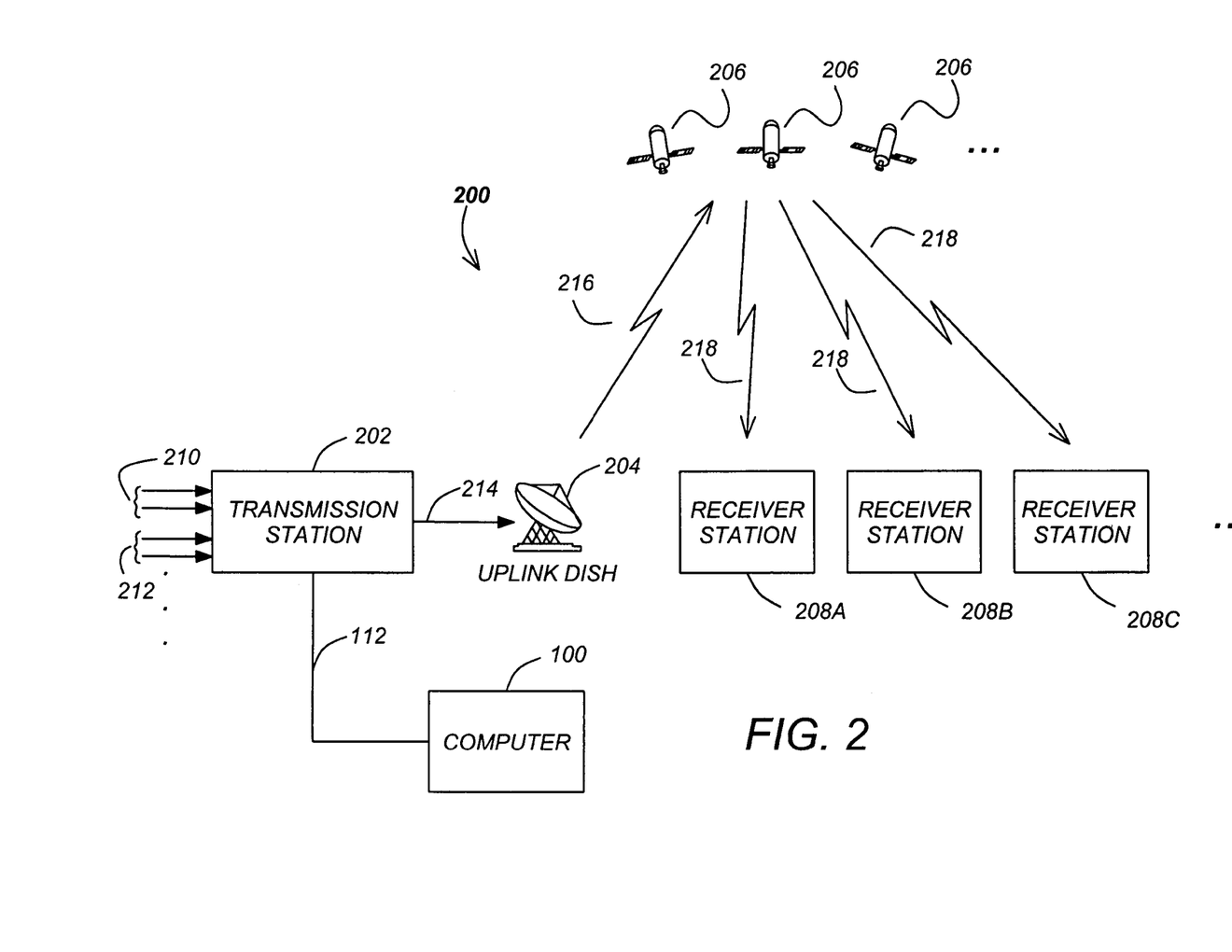
FIG. 2 illustrates a typical satellite television installation of the related art.

FIG. 2 illustrates a typical satellite television installation of the related art.

FIG. 2 shows a communications system, specifically a television broadcasting system 200, which transmits and receives audio, video, and data signals via satellite. Although the present invention is described in the context of a satellite-based television broadcasting system, the techniques described herein are equally applicable to other methods of program content delivery, such as terrestrial over-the-air systems, cable-based systems, and the Internet. Further, while the present invention will be described primarily with respect to television content (i.e. audio and video content), the present invention can be practiced with a wide variety of program content material, including video content, audio content, audio and video related content (e.g., television viewer channels), or data content (e.g., computer data).

Television broadcasting system 200 includes transmission station 202, uplink dish 204, at least one satellite 206, and receiver stations 208A-208C (collectively referred to as receiver stations 208). Transmission station 202 includes a plurality of inputs 210 for receiving various signals, such as analog television signals, digital television signals, video tape signals, original programming signals and computer generated signals containing HTML content. Additionally, inputs 210 receive signals from digital video servers having hard discs or other digital storage media. Transmission station 202 also includes a plurality of timing inputs 212, which provide electronic schedule information about the timing and content of various television channels, such as that found in television schedules contained in newspapers and television guides. Transmission station 202 converts the data from timing inputs 212 into program guide data. Program guide data may also be manually entered at the site of transmission station 202. The program guide data consists of a plurality of "objects". The program guide data objects include data for constructing an electronic program guide that is ultimately displayed on a user's television.

Transmission station 202 receives and processes the various input signals received on inputs 210 and timing inputs 212, converts the received signals into a standard form, combines the standard signals into a single output data stream 214, and continuously sends output data stream 214 to uplink dish 204. Output data stream 214 is a digital data stream that is typically compressed using MPEG2 encoding, although other compression schemes may be used.

The digital data in output data stream 214 are divided into a plurality of packets, with each such packet marked with a Service Channel Identification (SCID) number. The SCIDs can be used by a receiver in receiver station 208 to identify the packets that correspond to each television channel. Error correction data is also included in output data stream 214.

Output data stream 214 is typically a multiplexed signal that is modulated by transmission station 202 using standard frequency and polarization modulation techniques. Output data stream 214 preferably includes a plurality of frequency bands, typically sixteen frequency bands, with each frequency band being either left polarized or right polarized. Alternatively, vertical and horizontal polarizations may be used.

Uplink dish 204 continuously receives output data stream 214 from transmission station 202, amplifies the received signal and transmits signal 216 to at least one satellite 206. Although a single uplink dish 204 and three satellites 206 are shown in FIG. 2, multiple uplink dishes 204 and a larger number of satellites 206 are preferably used to provide additional bandwidth, and to help ensure continuous delivery of signals 214 to receiver stations 208.

Satellites 206 revolve in geosynchronous orbit about the earth. Satellites 206 each include a plurality of transponders that receive signals 216 transmitted by uplink dish 204, amplify the received signals 216, frequency shift the received signals 216 to different frequency bands, and then transmit the amplified, frequency shifted signals 218 back to desired geographic areas on the Earth, where receiver stations 208 are located or will be located at some time in the future. Receiver stations 208 then receive and process the signals 218 transmitted by satellites 206.

Each satellite 206 typically broadcasts signals 218 in thirty-two (32) different frequencies, which are licensed to various users for broadcasting of programming, which can be audio, video, or data signals, or any combination. These signals are typically located in the Ku-band of frequencies, i.e., 11-18 GHz, but can be broadcast in the Ka-band of frequencies, i.e., 18-40 GHz, more typically in the 20-30 GHz range, or other frequency bands.

The present invention contemplates connecting computer 100 to transmission station 202, via network 112, to control which of the inputs 210 and timing inputs 212 are physically located on each viewer channel or within a viewer channel, such that the output data stream 114 can be changed in near real-time. Although described with respect to a satellite television system 200, such an embodiment is merely exemplary, and other types of video programming systems, e.g., analog or digital terrestrial broadcasting, analog or digital cable television or data broadcasting, or other types of data delivery services are possible within the scope of the present invention.

Presentation of Multiple Video Streams

Figure 3:
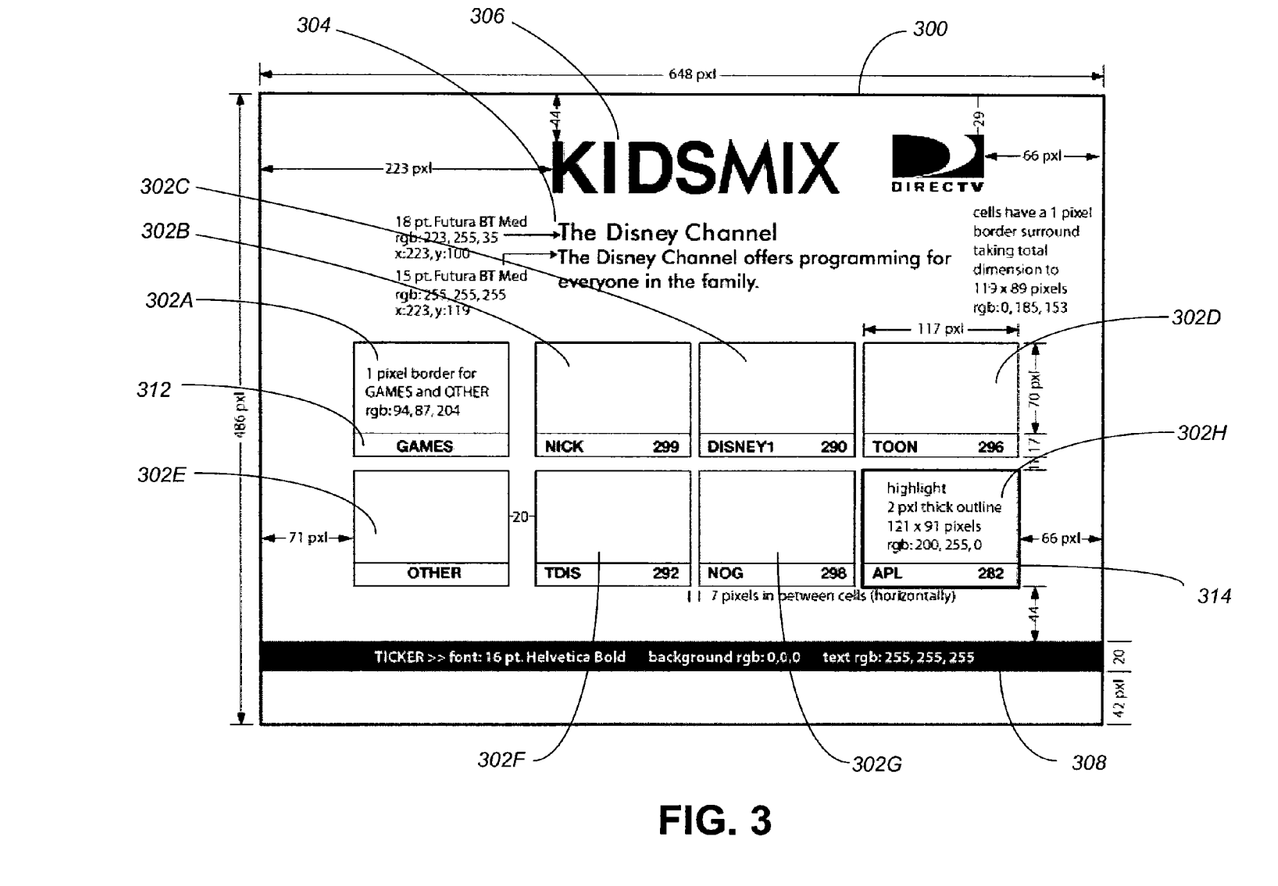
FIG. 3 illustrates a mosaic channel in accordance with the present invention.

FIG. 3 illustrates a typical eight-cell matrix video feed in accordance with the present invention.

Interactive mosaic channel 300 is shown as being displayed on a television monitor located at receiver station 208. Within interactive mosaic channel 300, there are a number of video cells 302A-H (collectively referred to as video cells 302) and a text box 304, also referred to as an On Screen Display (OSD) 304. Optionally, the interactive mosaic channel 200 further comprises a separate video cell, also called a "barker cell," a background video 306, and a dynamic ticker 308.

The number of video cells 302 can change based on the number of video cells 302 desired. As the number of video cells 302 increases, of course, there must be a reduction in the size of the video cells 302 to ensure that the video cells 302 are differentiated on the monitor. As the number of video cells 302 decreases, the size of the video cells 302 can increase, since there is more space available on a given monitor to display video cells 302.

Further, the placement of video cells 302, text box 304, and ticker 308, and any other information presented in mosaic channel 300, is not limited to the positions as shown in FIG. 3. These elements can be displayed anywhere on a monitor without departing from the scope of the present invention.

As there are multiple video feeds associated with video cells 302A-H, as well as with text box 304, and possibly dynamic ticker 308 and background video 306, each may have associated audio portions or other data streams that can be played or displayed as part of mosaic channel 300. Presenting more than one audio stream or data stream may be confusing; as such, it is typical that only one audio stream of information, or data stream associated with a given video cell 202, is presented at a given time. However, each of the video feeds may also have closed-captioning information associated with it, and selection of a closed-captioned presentation, rather than an audio presentation, can be performed as described herein.

Video Cells

Video cells 302A-H each contain a separate viewer channel of programming. So for example, in an interactive mosaic channel that is focused on news programming, cell 302A could contain the video programming associated with the viewer channel of FOX News Channel, cell 302B could contain the video programming associated with the viewer channel of CNN, cell 302C could contain the video programming associated with the viewer channel of Headline News, cell 302D could contain the video programming associated with the viewer channel of MSNBC, etc. The placement and video programming content for each video cell 302A-H can depend on a wide variety of factors, such as Nielsen ratings for a given channel, expected viewer rating or viewer share for a given video program, whether a given channel is available on a specific viewer's programming package, viewer channel number (lowest to highest or highest to lowest) or can be decided or changed based on programming that is present on one or more of the viewer channels available for the interactive mosaic channel. For example, and not by way of limitation, an important vote on the floor of the Senate may be taking place, and a decision can be made to change the placement of C-SPAN from video cell 302F to video cell 302A for a period of time. Changes in presentation for the interactive mosaic channel 300 are discussed below.

Within each of the video cells 302 can also be a channel identification (ID) box 312. Typically, the channel ID box 312 indicates to the viewer the moniker or name that is associated with the video feed being shown in that respective video cell 302, and the viewer channel number associated with the video feed being shown in that respective video cell 302.

Other information may also appear in channel ID box 312, such as an indication that the video feed that is being presented in the associated video cell 302 is a "user favorite" channel, the channel ID box 312 may be presented in a different color or video texture to indicate that the video feed that is being presented in the associated video cell 302 is a channel that presents programming that adults may wish to block from their children's view or has closed-captioning available, etc. Many possibilities are available within the scope of the present invention to present various types of video information within channel ID box 312 for viewer selection and benefit. The channel ID box 312 may also appear without a video cell 302 for those video feeds that are channel blocked via parental control, or otherwise unavailable to a specific viewer because of the viewer's programming package or other reasons.

Text Box

Text box 304 contains textual information that is useful to the viewer, and this information can change depending on the viewer's selection of interactive services as described herein. For example, the text box 304 can contain a generic statement about the genre of the interactive mosaic channel 300, or statements directed to a selected video cell 302 or information related to the channel ID box 312 to describe to a user the meaning of the information presented in the channel ID box 312 or other information related to the video cell 302 and channel ID box 312. The text box can also scroll to present additional information to the viewer that does not all fit within text box 304 at a given time.

There can also be default text associated with each interactive mosaic channel 300, and, depending on the capabilities of receiver station 208, each time an interactive mosaic channel 300 is tuned to, a default descriptive text shall be displayed in the text box 304.

Background Video

Background video 306 is typically a backdrop for the interactive mosaic channel 200. The background video 306 can be related to the genre of the interactive mosaic channel 300; for example, in a news environment, the background video 306 can be related to a top news story, the stock market exchange building, a prominent government building, etc. The background video 306 can be changed or can be a dynamic video depending on the desires of the editorial staff or viewer preferences. Further, the background video 306 can be a logo or other indicator of the source of the interactive mosaic channel 300, such as DIRECTV.

Dynamic Ticker

The dynamic ticker 308 can be used to provide real-time updates to the genre of the interactive mosaic channel 300. For example, in a news environment, the dynamic ticker 308 can provide breaking news that may hit news wires prior to being discussed or presented in the video cells 302. The dynamic ticker 308 can also be used to present other information, such as sports scores, stock market data, or other information, that can be related to the genre or to other issues. The dynamic ticker 308 can also be updated with new information at a different rate than that of the video cells 302, because the source of information that is used to create dynamic ticker 308 comes from a different source than the information that is presented in video cells 302.

Cursor 314 is also shown as currently "residing" on video cell 302H. Cursor 314 allows a viewer to select the audio or other data portions associated with video cell 302H (or any selected video cell 302) for presentation, as well as allowing viewers to direct tune to the video feed for video cell 302H (or any selected video cell 302), which would bring the video feed for the selected video cell to a "full screen" condition.

Administrative Control of Mosaic Channel Video Presentation

FIGS. 4-9 illustrate graphical user interfaces in accordance with the present invention.

Figure 4:
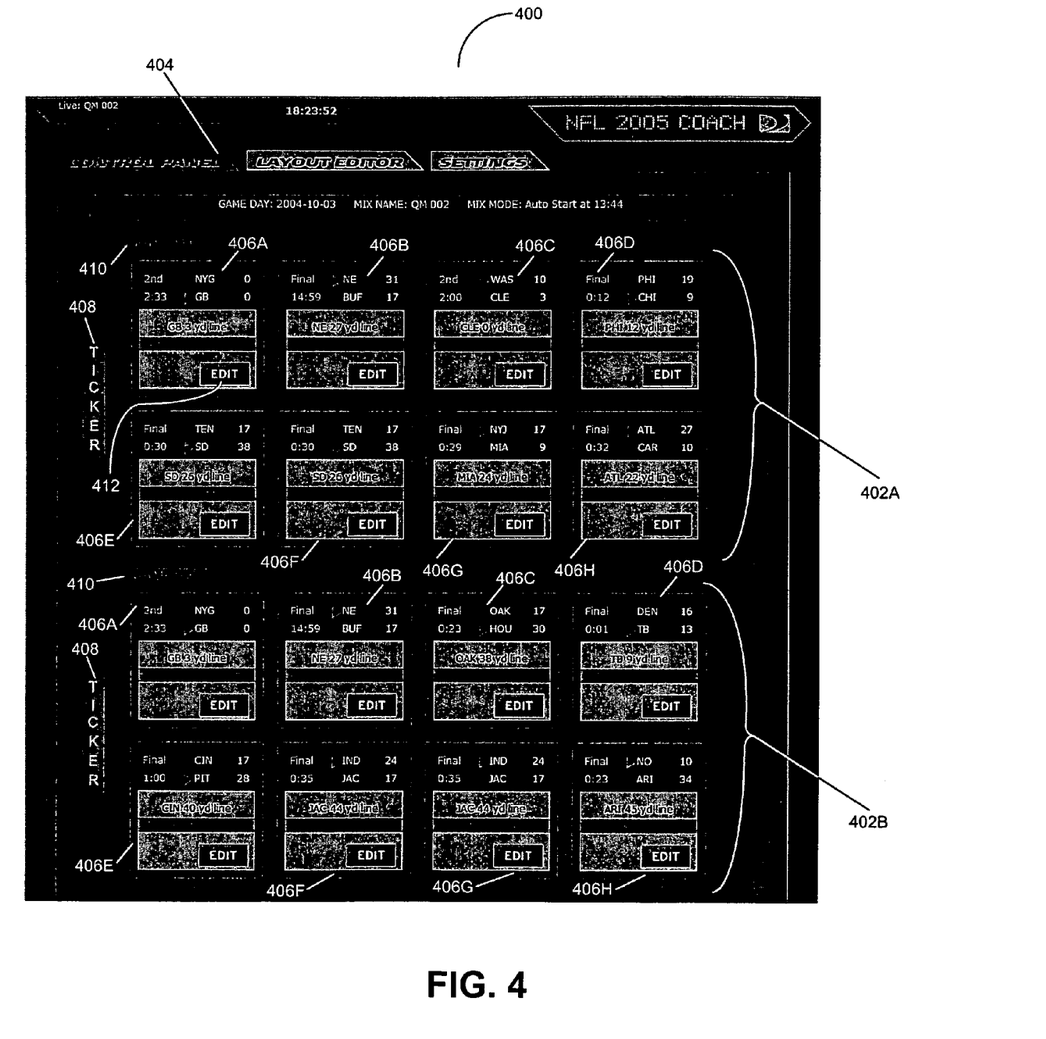
FIGS. 4-9 illustrate graphical user interfaces in accordance with the present invention.

FIG. 4 illustrates a typical control panel screen 400 of the present invention as presented on display device 102 of computer 100. Screen 400 shows two groups 402A and 402B, where group 402A represents the video cells 302, channel ID boxes 312, and ticker 308 that are present on one mosaic channel 300, while group 402B represents the video cells 302, channel ID boxes 312, and ticker 308 that are present on a different mosaic channel 300. The control panel tab 404 indicates that this is the top level control panel screen 400.

Within each group 402A-B, the user of control panel screen 400 has the option of using cursor control device 106, or other methods, of selecting one of the boxes 406A-H or ticker box 408. Since each of the boxes 406A-H and ticker box 408 correspond to video cells 302A-H and ticker 308 on a given mosaic channel 300, any edits to the information being presented in a given box 406A-H or ticker box 408 will change the information being presented on the corresponding mosaic channel 300 for that group 402A-B.

To describe groups 402A-B, there are monikers 410 above each group 402 to allow the user to know which group is being viewed.

Within each box 406A-H, there is an edit-button 412, which will allow for editing of the data streams shown in the boxes 406A-H. For example, in box 406A of group 402A, the data being presented on the corresponding video cell 302 shows that the score of the Green Bay Packers/New York Giants game is 0-0, and the ball is on the green bay 3 yard line, with Green Bay having possession of the ball. Further, the video data stream that is being displayed in the corresponding video cell 302A is also being shown in box 406A for the user of the present invention to view. There are 2 minutes and 33 seconds left in the second quarter. However, this data may be incorrect, because the data feed associated with this video feed is corrupted, or for other reasons. As such, a user can press the edit button 412 and manually edit this data. Once the edit button 412 is selected, a new screen will be presented to the user as shown in FIG. 5.

Sub-Menu Windows

Within control panel window 400, additional sub-menu windows are available as described herein.

Figure 5:
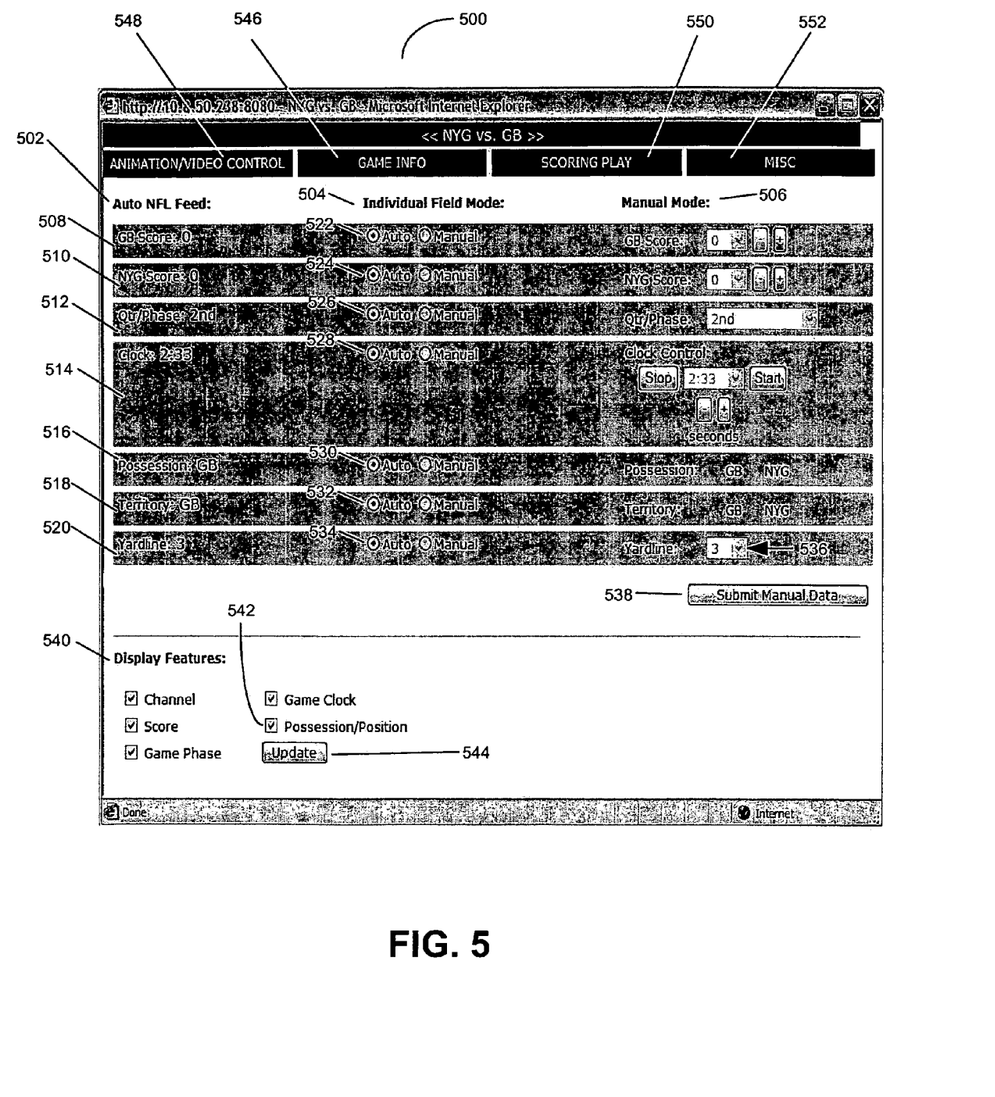

FIG. 5 illustrates individual data stream info on screen 500. As with the example shown in FIG. 4, the data is from a football game between the Green Bay Packers and the New York Giants, but the data can be from any event or other source of data associated with a given video stream. The automatically generated data from the data stream is presented in autofeed column 502, the individual fields can be altered or allowed to remain on automatic generation in field mode column 504, and the manual override mode column 506 is also shown. The present invention allows for manipulation of the data in autofeed column 502 as necessary.

Within autofeed column 502, the individual data fields of the data stream are presented. As above, the scores 508, 510 for each team, the time 512, 514 of the game, who is in possession 516, and where the ball is located 518, 520 is shown in individual data fields. These data fields each have associated radio buttons 522-534 in field mode column 504 which allow a user to select automatic data entry from the data feed, or manual override of the data being provided by the data feed. So, for example, if the data feed is incorrect or disabled for technical or other reasons, or corrupted, a user of screen 500 can select one or more of the radio buttons 522-534 to provide the correct data. For example, if Green Bay had moved the ball from their own 3 yard line to their own 45 yard line, but the automatic data feed did not provide that information, a user could select the manual radio button 534, and enter the new yardline in column 506 by editing the number in box 536 and clicking on button 538 to submit the manual data. When the "auto" radio buttons 522-534 are selected, the entry areas of column 506 are disabled.

Area 540 allows the user to edit which of the features are displayed in mosaic channel 300 through the use of check boxes. So, for example, the possession/position check box 542 can be "unchecked" which will remove the possession/position cursor from being displayed on the mosaic channel 300. Area 540 allows for correction of the autofeed for that data, or for the user to determine what is displayed in mosaic channel 300 video cells 302A-H. Button 544 allows for selections made in area 540 to be updated to the mosaic channel 300.

In addition to window 500, which is also know as game info window 500 shown as tab selection 546, there are other tab selections 548-552 that are available to the user of the present invention.

Figure 6:
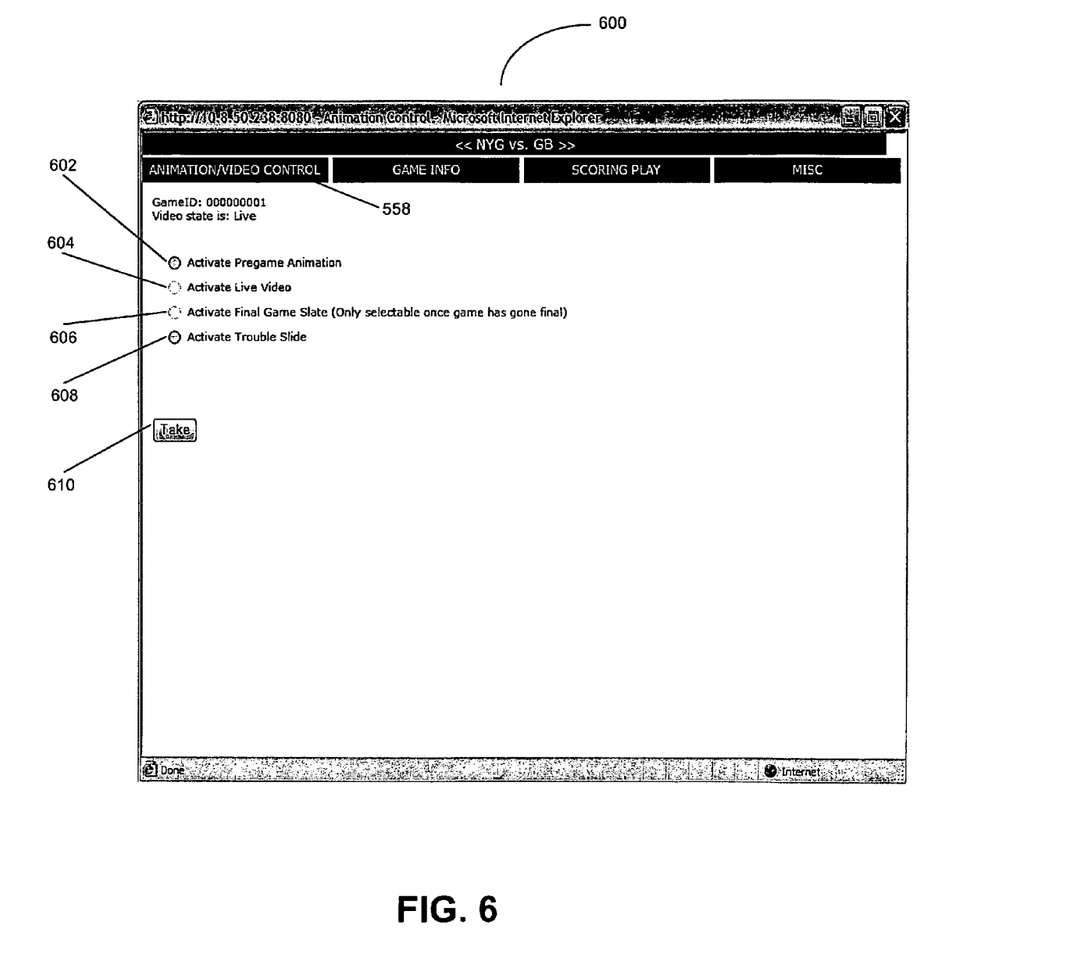

FIG. 6 is an animation and video control screen of the present invention. Animation and video control screen 600, which is selected by clicking on tab button 558, allows the user to select the video feed that is used for a given video cell 302. Radio buttons 602-608 allow for different video feeds to be selected, and radio button 610 "accepts" the selection made by the user. Radio button 602 selects a pre-event animation or other pre-event video feed. Radio button 604 selects the event live video feed, radio button 606 activates a post-event video feed, and radio button 608 activates a "trouble" feed. Other radio buttons 604-608 can be added to screen 600 without departing from the scope of the present invention, such as a post-event analysis or highlight video, a "no-video" slide that indicates the event is not available, or other radio buttons 604-608 that select different video presentations for a given video cell 302.

Figure 7:
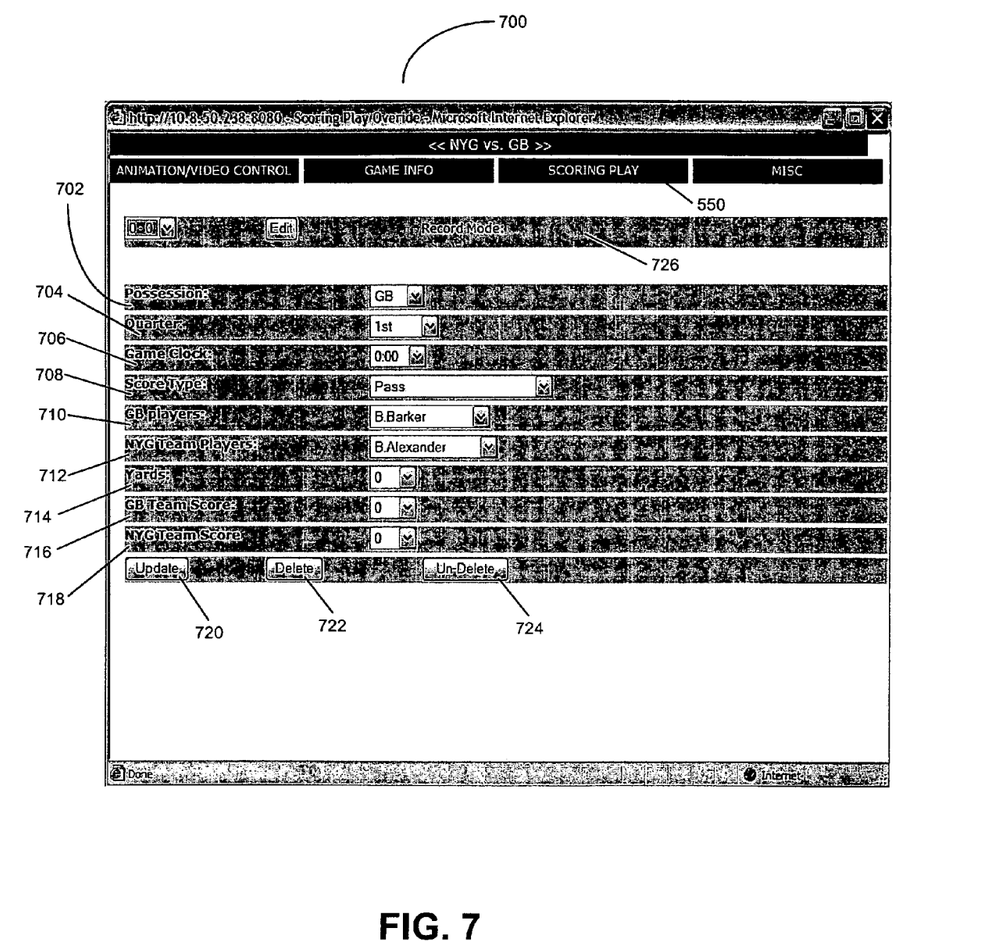

FIG. 7 illustrates a scoring play screen of the present invention.

When tab selection is chosen by the user, screen 700 will appear on the display device 102 of the user's computer 100. Screen 700 allows the user to input data relating to a scoring play, or other important occurrence, that takes place during an event being shown on one of the video cells 302.

Although a football game is discussed herein with respect to the example shown in FIG. 7, other sporting events, such as basketball, hockey, baseball, soccer, or other sporting events, or other events or video presentations are compatible with the present invention. Other selections for change bars 702-718, as well as additional change bars 702-718 may be required for these events, and such additional selections and modifications to the change bars 702-718 are contemplated as being within the scope of the present invention.

Change bars 702-718 allow for changes to or addition of a scoring play. Change bar 702 indicates who had possession of the ball, i.e., which team scored. Change bar 704 indicates the period or quarter in which the scoring play took place, and change bar 706 indicates the time at which the play occurred.

Change bar 708 indicates the score type, e.g., pass, run, kick, safety, or other type of scoring type depending on the sport being shown in associated video cell 302. Change bars 710-712 indicate the players involved in the scoring play from both teams involved. Change bar 714 indicates the number of yards that the scoring play consumed, and change bars 716-718 indicate the score of the contest after the scoring play took place.

Users of the present invention can use change bars 702-718 to manually enter scoring plays into computer 100, which are then stored in database 110 for use by various viewers of receiver stations 208. These scoring plays can be used for fantasy football leagues, which can then be automatically updated by these scoring plays, for betting or gambling reasons, or for other statistical purposes. The user can enter the proper information via the pulldown menus associated with each of the change bars 702-718 to enter the information on a given scoring play or other important event.

Button 720 is used to update the data entered in the pulldown menus of change bars 702-718, whereas buttons 722-724 are used to either delete or restore (un-delete) the changes made in change bars 702-718. Updated data is then sent to the video cell 302.

Layout Editor

Figure 8:
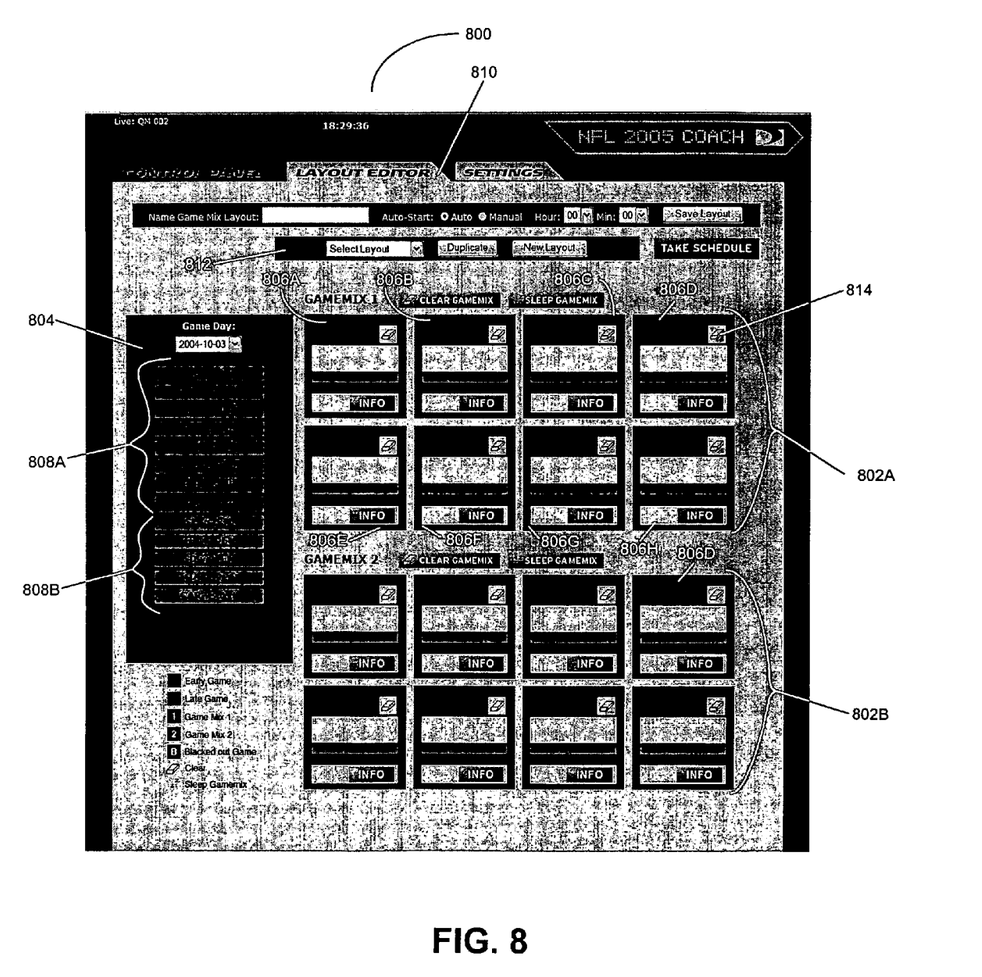

FIG. 8 illustrates a layout editor screen in accordance with the present invention.

Screen 800 shows groups 802A and 802B, selection panel 804, entry cells 806A-H, and groups of individual events 808A and 808B. Screen 800 is selected by selecting tab heading 810.

Groups 802A and 802B indicate the layout of the video cells on matrix channels 300 to be presented to viewers on receiver stations 208. Group 802A is illustrated with entry cells 806A-H, which are also present in group 802B. Each entry cell 806A-H corresponds with a box 402A-H (which corresponds with a video cell 302A-H) respectively, and the video and other data presented in video cell 302A-H is initially edited here, such that the video feed and other associated data is entered into entry cells 806A-H, and then displayed on video cells 302A-H on a television monitor connected to receiver station 208.

Layout bar 812 allows for a selection of a layout for each of the groups 802A and 802B, including but not limited to standard layouts or customized layouts. Further, the number of entry cells 806A-H, which correspond to the number of video cells 302A-H that will be seen on a viewer's television, can be changed using layout bar 812. Group 802A is the group of entry cells 806A-H that are seen on a first mosaic channel 300, while group 802B is a group of entry cells 806A-H that are seen on a second mosaic channel 300.

Events 808A and 808B are typically grouped by genre, but can also be grouped by other criteria. For example, as shown here, group 808A are the games that start at a certain time (the "early games"), while group 808B are the games that start at a later time than those in group 808A.

To use the administrative tool of the present invention, a user takes an event in one of the groups 808A-B, and moves the event to one or more of the entry cells 806A-H in either of groups 802A-B, by "dragging and dropping" the event into one or more of the entry cells 806A-H. By associating (through dragging and dropping) the events in groups 808A-B with a given entry cell 806A-H, associated video feed, audio, data feeds, etc. are routed to the video cell 302A-H on a given video feed. The events in groups 808A-B can be moved as a user desires to re-arrange the video cells 302A-H by modifying the entry cells 806A-H. This can be done as described above to arrange the video presentations for each video cell 302A-H by Nielsen rating, games in progress taking higher priority, or to show a highlights channel or other channel on the mosaic channel 300 if desired.

Each entry cell 806A-H has a clear box 814 to allow the user to clear that respective entry cell 806A-H to enter new data or leave that entry cell 806A-H without a video feed. This may be necessary if an event is a "pay per view" event that a viewer has not paid for, if a game or event is "blacked out" in certain areas, or other reasons. Other screens, e.g., screen 600 mentioned above, can be used to enter a static display or other message for that entry cell 806A-H if desired.

Administrative Tool Settings

Figure 9:
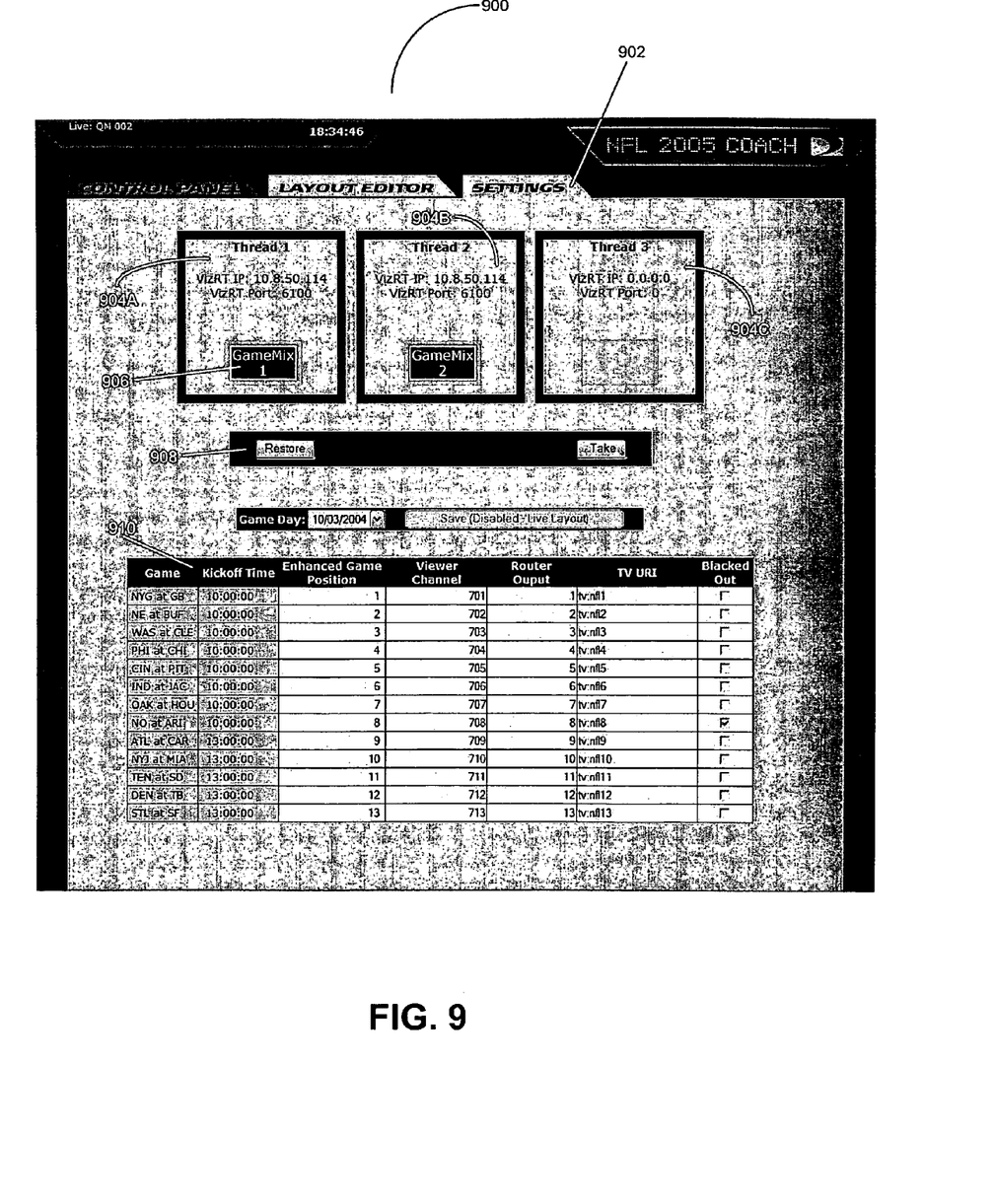

FIG. 9 illustrates a settings screen of the present invention.

Screen 900 allows the user of the present invention to manipulate "threads" of video from video feeds into a given mosaic channel 300. Screen 900 is entered by selecting tab selector 902.

There can be multiple threads 904A-C available as inputs to a given mosaic channel 300. By selecting mosaic channel 300 at button 906, button 906 can be dragged and dropped into any available thread 904A-C. As shown in FIG. 9, button 906 represents a first mosaic channel 300 named "GameMix 1" which is currently resident on thread 1 904A, but this can be dragged and dropped into thread 3 904C. To complete the video feed change, bar 908 has a "Take" button to accept the thread 904A-C change, and a "Restore" button to return the threads 904A-C to an original or predetermined configuration.

Area 910 illustrates for the user the events to be shown in tabular format, for each of the threads 904A-C with video feeds being used.

Flowchart

Figure 10:
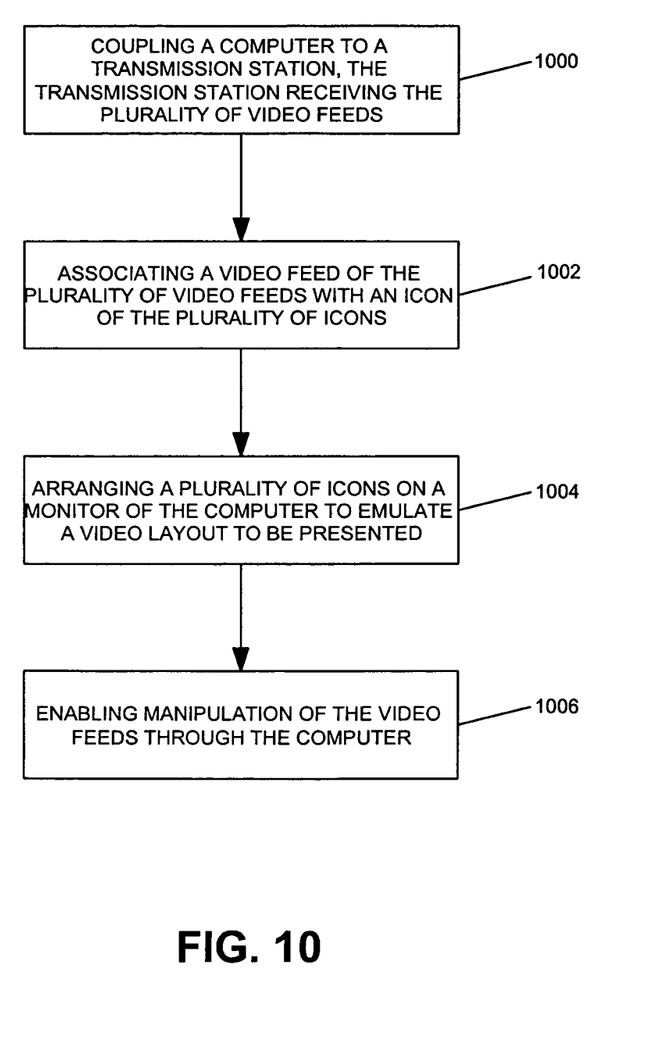
FIG. 10 is a flowchart illustrating the steps of the present invention.

FIG. 10 is a flowchart illustrating the steps of the present invention.

Box 1000 illustrates coupling a computer to a transmission station, the transmission station receiving the plurality of video feeds.

Box 1002 illustrates associating a video feed of the plurality of video feeds with an icon of the plurality of icons.

Box 1004 illustrates arranging a plurality of icons on a monitor of the computer to emulate a video layout to be presented.

Box 1006 illustrates enabling manipulation of the video feeds through the computer.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. Further, other computing devices with monitors, such as cellular telephones, Personal Data Assistants (PDAs), or other devices can be used instead of a computer without departing from the scope of the present invention.

In summary, embodiments of the invention provide methods, apparatuses, and articles of manufacture for the present invention discloses a method, apparatus, and article of manufacture for administering a video channel comprising a plurality of video feeds. A method in accordance with the present invention comprises coupling a computer to a transmission station, the transmission station receiving the plurality of video feeds, arranging a plurality of icons on a monitor of the computer to emulate a video layout to be presented, associating a video feed of the plurality of video feeds with an icon of the plurality of icons, and enabling manipulation of the video feeds through the computer.

Such a method optionally includes displaying data associated with the video feeds within at least one of the plurality of icons, enabling manipulation of the data associated with the video feeds, associating the plurality of icons with a plurality of video cells to be displayed on a video channel, the video feed being a sporting event, the data associated with the video feed being statistics related to the sporting event, and the computer being coupled to the transmission station via a network.

An apparatus in accordance with the present invention comprises a computer having a monitor, and a transmission station, coupled to the computer, for receiving the plurality of video feeds, wherein the monitor displays a plurality of icons to emulate a video layout to be presented, the computer associates a video feed of the plurality of video feeds with an icon of the plurality of icons, and the computer manipulates the video feeds based on inputs received.

Such an apparatus optionally includes the monitor and computer displaying data associated with the video feeds within at least one of the plurality of icons, the computer allowing for manipulation of the data associated with the video feeds, the computer associating the plurality of icons with a plurality of video cells to be displayed on a video channel, the video feed being a sporting event, and the data associated with the video feed being statistics related to the sporting event.

An article of manufacture comprising a program storage medium readable by a computer and embodying one or more instructions executable by the computer to perform a method for administering a video channel comprising a plurality of video feeds in accordance with the present invention uses a method comprising coupling a computer to a transmission station, the transmission station receiving the plurality of video feeds, arranging a plurality of icons on a monitor of the computer to emulate a video layout to be presented, associating a video feed of the plurality of video feeds with an icon of the plurality of icons, and enabling manipulation of the video feeds through the computer.

Such an article of manufacture optionally includes displaying data associated with the video feeds within at least one of the plurality of icons, enabling manipulation of the data associated with the video feeds, associating the plurality of icons with a plurality of video cells to be displayed on a video channel, the video feed being a sporting event, the data associated with the video feed being statistics related to the sporting event, and the computer being coupled to the transmission station via a network.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the equivalents thereof.

What is claimed is:

1. A method for administering a video channel comprising a plurality of video feeds, comprising:
coupling a head-end computer to a transmission station, the transmission station receiving the plurality of video feeds;
arranging a plurality of icons on a monitor of the head-end computer to emulate a video layout to be presented;
associating, using the head-end computer, a video feed of the plurality of video feeds with an icon of the plurality of icons;
associating, using the head-end computer, a separate data stream with the video feed and the icon in the plurality of icons, wherein the separate data stream comprises a plurality of individual fields;
upon selection of the icon in the plurality of icons, displaying, on a first screen, the plurality of individual fields and corresponding automatically generated data from the separate data stream associated with the video feed;
displaying, for each of the individual fields, an option to utilize the automatically generated data from the separate data stream or to replace the automatically generated data with manually entered data;
receiving input that specifies which individual fields of the plurality of individual fields are to be displayed within the icon;
displaying a video selection menu on a second screen wherein:
the video selection menu accepts input that determines the content of the video feed; and
the content of the video feed is selectable from a variety of feeds relating to an event; and
editing at least one of a content of the video feed and a value within the automatically generated data from the separate data stream associated with the video feed on the first screen at the computer by manually replacing at least one of the content of the video feed and the value within the automatically generated data prior to transmission of the video feeds and the automatically generated data.

2. The method of claim 1, further comprising associating the plurality of icons with a plurality of video cells to be displayed on a video channel.

3. The method of claim 2, wherein the video feed is a sporting event.

4. The method of claim 3, wherein the data associated with the video feed is statistics related to the sporting event.

5. The method of claim 4, wherein the computer is coupled to the transmission station via a network.

6. The method of claim 1, wherein:
the individual fields comprise a channel field, a score field, a game phase field, a game clock field, and a possession/position field.

7. The method of claim 1 wherein the variety of feeds relating to the event comprise a pre-event animation, an event live-video feed, a post-event video feed, and a trouble feed.

8. An apparatus for administering a video channel comprising a plurality of video feeds, comprising:
a head-end computer having a monitor; and
a transmission station, coupled to the head-end computer, for receiving the plurality of video feeds, wherein:
the monitor displays a plurality of icons to emulate a video layout to be presented and separate data streams associated by the computer with the video feeds within at least one of the plurality of icons;
the head-end computer associates a video feed of the plurality of video feeds with an icon of the plurality of icons and associates a separate data stream of the plurality of separate data streams with the video feed and the icon in the plurality of icons, wherein the separate data stream comprises a plurality of individual fields;
upon selection of the icon in the plurality of icons, the head-end computer displays, on a first screen, the plurality of individual fields and corresponding automatically generated data from the separate data stream associated with the video feed;

the head-end computer displays, for each of the individual fields, an option to utilize the automatically generated data from the separate data stream or to replace the automatically generated data with manually entered data;

the head-end computer receives input that specifies which individual fields of the plurality of individual fields are to be displayed within the icon;

the head-end computer displays a video selection menu on a second screen wherein:
the video selection menu accepts input that determines the content of the video feed; and
the content of the video feed is selectable from a variety of feeds relating to an event; and the head-end computer enables manual editing of at least one of a content of the video feed and a value within the separate data stream associated with the video feed at the computer on the first screen based on inputs received, wherein at least one of the content of the video feed and the value within the automatically generated data is manually replaced at the computer prior to transmission of the video feeds and the automatically generated data.

9. The apparatus of claim 8, wherein the head-end computer associates the plurality of icons with a plurality of video cells to be displayed on a video channel.

10. The apparatus of claim 9, wherein the video feed is a sporting event.

11. The apparatus of claim 10, wherein the data associated with the video feed is statistics related to the sporting event.

12. The apparatus of claim 8, wherein:
the individual fields comprise a channel field, a score field, a game phase field, a game clock field, and a possession/position field.

13. The apparatus of claim 8, wherein the variety of feeds relating to the event comprise a pre-event animation, an event live-video feed, a post-event video feed, and a trouble feed.

14. An article of manufacture comprising a program storage medium readable by a computer and embodying one or more instructions executable by the computer to perform a method for administering a video channel comprising a plurality of video feeds, the method comprising:

coupling a head-end computer to a transmission station, the transmission station receiving the plurality of video feeds;

arranging a plurality of icons on a monitor of the head-end computer to emulate a video layout to be presented;

associating, with the head-end computer, a video feed of the plurality of video feeds with an icon of the plurality of icons;

associating, with the head-end computer, a separate data stream with the video feed and the icon in the plurality of icons, wherein the separate data stream comprises a plurality of individual fields;

upon selection of the icon in the plurality of icons, displaying, on a first screen, the plurality of individual fields and corresponding automatically generated data from the separate data stream associated with the video feed;

displaying, for each of the individual feeds, an option to utilize the automatically generated data from the separate data stream or to replace the automatically generated data with manually entered data;

receiving input that specifies which individual fields of the plurality of individual fields are to be displayed within the icon;

displaying a video selection menu on a second screen wherein:
the video selection menu accepts input that determines the content of the video feed; and
the content of the video feed is selectable from a variety of feeds relating to an event; and editing at least one of a content of the video feed and a value within the automatically generated data from the separate data stream associated with the video feed on the first screen at the head-end computer by manually replacing at least one of the content of the video feed and the value within the automatically generated data prior to transmission of the video feeds and the automatically generated data.

15. The article of manufacture of claim 14, the method further comprising associating the plurality of icons with a plurality of video cells to be displayed on a video channel.

16. The article of manufacture of claim 15, wherein the video feed is a sporting event.

17. The article of manufacture of claim 16, wherein the data associated with the video feed is statistics related to the sporting event.

18. The article of manufacture of claim 17, wherein the head-end computer is coupled to the transmission station via a network.

19. The article of manufacture of claim 14, wherein:
the individual fields comprise a channel field, a score field, a game phase field, a game clock field, and a possession/position field.

20. The article of manufacture of claim 14, wherein the variety of feeds relating to the event comprise a pre-event animation, an event live-video feed, a post-event video feed, and a trouble feed.

* * * * *